(12) United States Patent
Zadravec

(10) Patent No.: US 6,369,941 B2
(45) Date of Patent: Apr. 9, 2002

(54) DEVICE WITH NIGHT VISION CAPABILITY

(75) Inventor: Dusan Zadravec, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 09/781,550

(22) Filed: Feb. 13, 2001

(30) Foreign Application Priority Data

Feb. 15, 2000 (EP) .............................. 00103018

(51) Int. Cl.$^7$ .............................. G01C 3/08; G02B 23/00
(52) U.S. Cl. ........................ 359/419; 359/407; 356/4.01
(58) Field of Search ........................ 356/3.01–5.15; 359/407, 419

(56) References Cited

U.S. PATENT DOCUMENTS

| | | | |
|---|---|---|---|
| 3,712,702 A | | 1/1973 | Schmidt |
| 4,398,788 A | * | 8/1983 | Dietz ........................ 350/550 |
| 4,467,190 A | * | 8/1984 | Hadani ........................ 250/213 |
| 5,084,780 A | * | 1/1992 | Phillips ........................ 359/350 |
| 5,282,082 A | * | 1/1994 | Espie et al. ................. 359/353 |
| 5,621,567 A | * | 4/1997 | Quint et al. ................. 359/407 |
| 5,712,726 A | * | 1/1998 | Espie et al. ................. 359/419 |
| 5,886,814 A | * | 3/1999 | Afsenius ..................... 359/407 |
| 5,902,996 A | | 5/1999 | Sauter |
| 6,201,641 B1 | * | 3/2001 | Filipovich ................... 359/419 |
| 6,204,961 B1 | * | 3/2001 | Anderson et al. ........... 359/353 |
| 6,219,250 B1 | * | 4/2001 | Palmer ....................... 361/752 |

FOREIGN PATENT DOCUMENTS

| | | |
|---|---|---|
| EP | 0 278 929 A1 | 8/1988 |
| WO | WO 99/05547 A1 | 2/1999 |

* cited by examiner

Primary Examiner—Thomas H. Tarcza
Assistant Examiner—Brian Andrea
(74) Attorney, Agent, or Firm—Rothwell, Figg, Ernst & Manbeck

(57) ABSTRACT

A device having night vision capability, in particular a laser distance-measuring device, has at least two optical channels (A–C), of which a first (A) focuses the low-level light emitted by an object by a mirror (2) and of an optical system (3) onto the entry window (4) of a low-light-level amplifier (5). The image of the object, which is available at the exit window (6) of the low-light-level amplifier (5), is displayed in a predetermined wavelength range and is electronically amplified, and is projected by a further mirror (8) to a receptor (13') on the second optical channel. The first optical channel (A) responsible for night observation has at least one of the mirrors (2; 8) in the form of a first splitter mirror (2; 8) which can be switched on or off and reflects the light in the predetermined wavelength range but is essentially completely transparent for the laser wavelength. Furthermore, in addition to the optical system (3) focusing the low-level light emitted by an object onto the entry window (4) of the low-light-level amplifier (5), a further optical system (7) is also provided which focuses the electronically amplified image of the object, available at the exit window (6), in an associated image plane (10).

10 Claims, 1 Drawing Sheet

DEVICE WITH NIGHT VISION CAPABILITY

FIELD OF THE INVENTION

The present invention relates to a laser distance-measuring device. Such a laser distance-measuring device, but without night vision capability, is on the market, for example under the names LEICA GEOVID and Leica VECTOR.

DESCRIPTION OF BACKGROUND ART

Binocular devices designed for daylight use, optionally including laser distance-measuring devices which also permit monocular or binocular observation of the night image, are designed according to the following principle. For night use, at least one of the two eyepieces is removed and is replaced in each case by an optical system which consists of a lens, a low-light-level amplifier and a special eyepiece. Such a solution accordingly has weaknesses: from the technical point of view, the removal of an eyepiece in the case of military devices is in contradiction to the required gas-tightness of the device, with the result that an expensive solution is required for achieving this gas-tightness. From the tactical point of view, it is moreover disadvantageous that the user on the one hand has to carry the "night vision accessory" with him and, on the other hand, has to carefully look after the replaced standard eyepiece, which entails both weight problems and problems with respect to comfort of wearing, quite apart from the greater possibility that optical surfaces may be scratched.

In addition, the device with the night vision accessory is substantially longer and as such is more inconvenient.

SUMMARY OF THE INVENTION

Accordingly, it is the object of the invention to provide night vision capability for devices designed per se just for daylight use, such as telescopes or laser distance-measuring devices, without the above-mentioned disadvantages being present.

This object is achieved by realizing the characterizing features of claim 1. Advantageous and alternative embodiments are described by the features of the dependent claims.

Since, according to the invention, the low-light-level amplifier is permanently installed and its optional switching on makes it possible to perform functions such as, in particular, the distance measurement function also under night-time conditions without optical components, such as the eyepiece, having to be removed, the problem of possible gas permeability is eliminated. The user need no longer carry separate parts (which can thus be lost) with him, with the result that both the total weight and the comfort of wear are substantially improved. Moreover, on the basis of the present invention, the length and the ease of operation of the device having night vision capability also remain unchanged in comparison with pure daylight devices.

When a splitter mirror which can be switched on and off is referred to in connection with this invention, this is understood as meaning, in the widest sense, as including, for example, a correspondingly electrically switchable liquid crystal. However, it is preferable if at least one of the splitter mirrors is an optical element, in particular a plane-parallel plate, which can be tilted about an axis of rotation from one, optionally adjustable end position into another, optionally adjustable end position.

When a receptor is referred to in connection with this invention, this will generally be the human eye but might also be a video camera or another sensor.

Furthermore, of course, the invention can also be applied in principle to monocular devices, such as telescopes or laser distance-measuring devices; in general, however, it will be preferable—similarly for reasons of comfort—that the first and the second optical channels are part of a binocular system.

BRIEF DESCRIPTION OF THE DRAWING

The invention is described below by way of example with reference to embodiments shown schematically in the drawing.

DETAILED DESCRIPTION OF THE INVENTION

Figure 1:
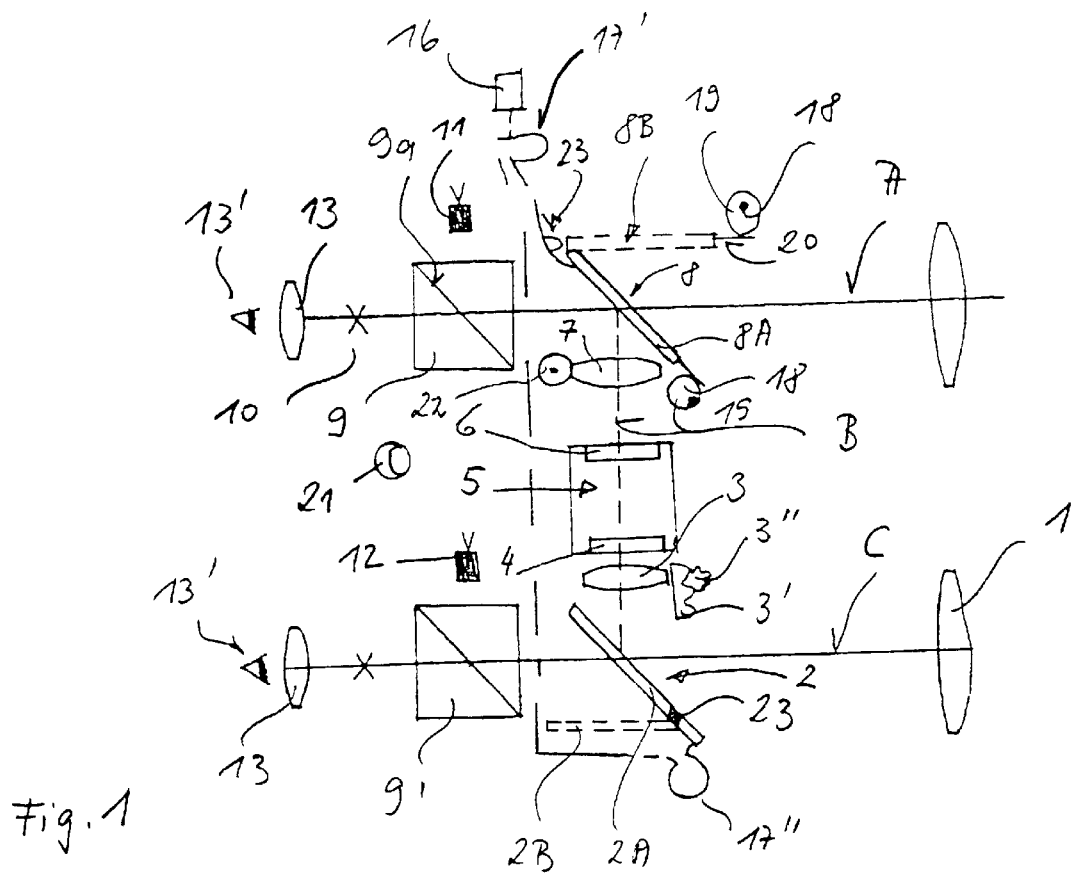
FIG. 1 shows a schematic representation of an arrangement, according to the invention, of a low-light-level amplifier and the associated optical system in a binocular laser distance-measuring device

The substantial components of the optical arrangement according to the invention for a laser distance-measuring device are shown in FIG. 1. A splitter mirror 2 reflecting in the wavelength range of 400 to 1000 nm, preferably 450 to 950 nm and in operating position 2B deflects the light arriving along an axis A through a lens 1 of the laser distance-measuring device from an object to be observed or to be surveyed towards the entry window 4 of a low-light-level amplifier 5, along an optical axis B. For focusing the light onto the entry window 4, focusing means having a lens 3 with mechanical elements known for focusing, such as, for example, toothed rack 3' and a pinion 3", is coordinated with the lens 1. The low-light-level amplifier corresponds in its design advantageously to a generation present on the market under the name Gen II, Gen III or Gen IV. In the low-light-level amplifier 5, the image of the object is electronically amplified and will as a rule appear as a bright, phosphorescent green image at its exit window 6. This green image is guided via an optical system 7, in the present case a lens system, initially to a second splitter mirror 8 in operating position 8B, which diverts the green light of the exit window 6 towards a beam splitter 9 having a splitter surface 9a. The green light is finally focused in an image plane 10. Consequently, the user is enabled to observe an electronically amplified green image of the object with one eye through an eyepiece 13 of the laser distance-measuring device.

However, it would also be possible, for example in the image plane 10, to provide a further splitter surface which has an orientation perpendicular to the splitter surface 9a and deflects the image to an optical axis C parallel to the axis A for the second eye, where the image is also fed to the second eye in a manner known for reflection.

The two splitter mirrors 2 and 8—whose switched-off position, the so-called rest position (corresponding to daylight use of the laser distance-measuring device), is denoted by 2A and 8A, respectively—have a special coating. The first splitter mirror 2 reflects light in a wavelength range corresponding to the light arriving from the exit window 6, i.e. about 400 to 1000 nm, preferably 450 to 950 nm. In the case of conventional design of the exit windows 6 of the low-light-level amplifier 5, the reflection maximum will be in the range of phosphorescent green, but this is not essential for the invention since, in a future low-light-level amplifier, another wavelength range might be emitted. In any case, however, in the present embodiment both splitter mirrors 2 and 8 are simultaneously essentially completely transparent for the wavelength, used in each case, of a laser 11, i.e. between about 1400 and 1800 nm, in the application described preferably about 1550 nm.

In the present embodiment, the two splitter mirrors 2 and 8 are the only parts which have to be mechanically moved for switching from a day function to a night function (and vice versa) of the device. By pressing a button 16 which can be operated on the outside of the housing (not shown) of the laser distance-measuring device, as indicated by a dash-dot line, both splitter mirrors 2, 8 are moved. This can be effected, for example, with the aid of tilt springs 17' and 17", which may be designed as omega springs in the form shown. In any case, the two splitter mirrors 2, 8 then tilt simultaneously in each case about an axis of rotation 23 from one end position, for example from the rest position 2A, 8A, into the other end position, for example the operating position 2B, 8B. The end positions can be determined by stops, which preferably are adjustable at least for the position when switched into the beam path. In the present case, cams 19 which in each case are rotatable about an axis 18 are provided for the adjustment and are shown for the mirror 8, it being possible for the adjustment means for the first splitter mirror 2 to be designed identically or in another known manner. The cams 19 act on end extensions 20 of the splitter mirrors 2 and 8.

As already mentioned above with reference to the various axes A–C, the optical system according to FIG. 1 has a plurality of optical channels. From the channel having the axis A, laser light emitted by the laser 11 and reflected by the object is deflected by means of a second beam splitter 9" onto a receiver 12 which may be formed in a conventional manner and whose signal is evaluated in a manner known for laser distance-measuring devices. The fact that the laser 11 and the receiver 12 are thus present in a separate channel in each case could lead to misadjustment of the laser distance-measuring device. Because of the optical arrangement according to the invention, however, the two splitter mirrors are always switched on parallel to one another and simultaneously. This is permitted particularly easily by the common actuation means, in this case in the form of a button 16. However, this means that the offset in both optical channels A, C' takes place in the same direction and hence the laser distance-measuring device remains fully adjusted even in its night function. The adjustment means 18–20 is once again particularly useful for this purpose.

Depending on the required magnification of the device for night use, the optical system 7 can be developed with a very wide range of focal distances or imaging scales. It should be emphasised here that this optical system in FIG. 1 is represented only schematically by a single lens 7 but that it may be a zoom module capable of changing the imaging scale in the image plane 10. For this purpose, a setting means, for example having a rotary button 21 and a pinion 22, for focusing the electronically amplified image of the object available at the exit window 6 in the image plane 10 with a variable imaging scale, is advantageously coordinated with the optical system 7. The setting means 21, 22 can be formed in any manner known for zoom means.

The focusing system which is formed by the lens 3 (and which, if desired, may also consist of a plurality of lenses) is in any case designed so that the object image thrown by the lens 1 is focused onto the entry window 4 of the low-light-level amplifier 5 or can be focused with the aid of the focus setting means 3', 3". Of course, it is necessary to take into account the fact that the lens 1 will have a predetermined depth of field, and hence a predetermined tolerance with respect to essentially inaccurate focusing.

Figure 2:
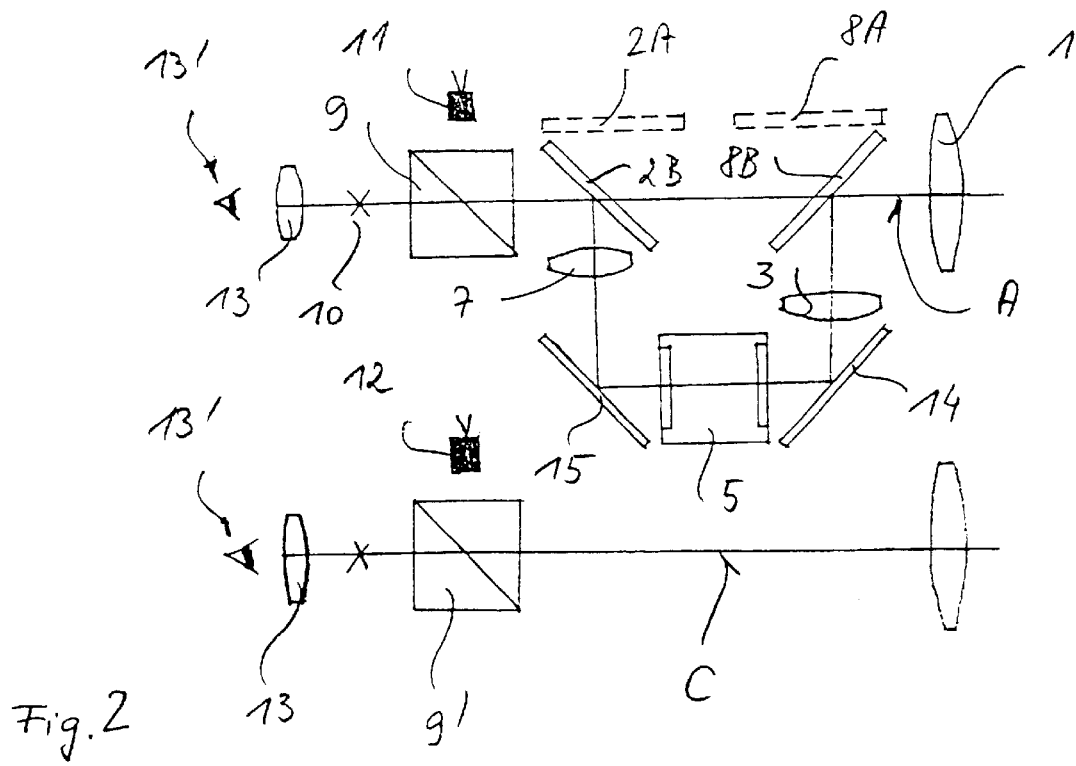
FIG. 2 shows a schematic representation of a second arrangement, according to the invention, of a low-light-level amplifier and associated optical system in a binocular laser distance-measuring device.

The substantial feature of the embodiment shown in FIG. 2 is that reception and observation of the low-level light take place in one and the same optical channel. This is in contrast to FIG. 1, where the low-level light of the object is received in one optical channel, namely that with the axis C, and—after electronic amplification and limitation to a wavelength range emitted by the exit window 6 (in particular green)—is observed in another channel with the axis A.

For this purpose, two additional light deflections are employed in such a way that the two splitter mirrors 2 and 8, at least in the state switched on for night vision, are parallel to one another in the same optical channel A, two reflective elements, in particular fully reflecting mirrors 14, 15, being additionally provided for folding the optical axis. The two mirrors 14, 15 are expediently highly reflective and need not be moved, i.e. they are positioned in a stable manner. Of course, in this case too, each of the switched-on splitter mirrors 2, 8 causes a displacement of the optical axis, at least as long as it is in the form of a plane-parallel plate, as shown. However, the displacement is in opposite directions, which leads to compensation when the plates are identically designed, so that here too the laser distance-measuring device remains fully adjusted.

Of course, the use of plane-parallel plates for beam splitting is not the only possibility and that, for example for adjustment purposes, a surface of at least one wedge can also be covered with a semireflecting coat in a similar manner, as is the case—for other purposes—in the beam dividers 9 and 9'.

The advantages of the invention are obvious:

The very compact design integrating the low-light-level amplifier 5 permits a very small number of optical elements (splitter mirrors 2, 8) which can be switched on for night use. Consequently, both the weight is reduced and the temperature and shock stability of the laser distance-measuring device in general, and in particular under night conditions, is improved;

the integration of the low-light-level amplifier 5 does not change the external shape of the laser distance-measuring device, but leads to a method of operation which is unchanged compared with use in daylight;

the integration of the low-light-level amplifier 5 avoids the carrying of separate parts, which can therefore be lost, and also simplifies the gas seal in the region of the eyepiece 13.

What is claimed is:

1. Device having night vision capability, comprising at least two optical channels (A, B, C), of which a first channel (A) focuses the low-level light emitted by an object, by means of a first mirror (2) and an optical system (3), onto an entry window (4) of a low-light-level amplifier (5), from which the image of the object which is available at the exit window (6) of the low-light-level amplifier (5), displayed in a predetermined wavelength range and electronically amplified is projected by means of a second mirror (8) to a receptor (13') on the second optical channel, characterized in that the first optical channel (A) responsible for night observation has at least the following optical components:

a) one of the mirrors (2; 8) is designed as a first splitter mirror (2; 8) which can be switched on and off and reflects the light in the predetermined wavelength range but is essentially completely transparent for another wavelength;

b) a further optical system (7) which focuses the electronically amplified image of the object which is available at the exit window (6) in an associated image plane (10).

2. Device according to claim 1, characterized in that the other mirror is in the form of a second splitter mirror (8) which can be switched on and off and has a reflection maximum in the predetermined wavelength range but is essentially completely transparent for the other wavelength, this second splitter mirror (8) which can be switched on or off being parallel to the first one at least in the switched-on state (FIGS. 1, 2).

3. Device according to claim 1 characterized in that at least one of the following features is provided:
   a) the predetermined wavelength range comprises the wavelength between 400 and 1000 nm, preferably between 450 and 950 nm, in particular the wavelength range of phosphorescent green;
   b) the other wavelength is the wavelength of a laser transmitter of a laser distance-measuring device installed in the device, the laser wavelength preferably being between about 1400 and 1800 nm, preferably about 1550 nm;
   c) the first and the second optical channels are part of a binocular system.

4. Device according to claim 1 characterized in that a setting means (21, 22) for focusing the electronically amplified image of the object which is available at the exit window (6) in the image plane (10) with variable imaging scale is coordinated with the further optical system (7).

5. Device according to claim 2 characterized in that the two splitter mirrors (2, 8) are parallel to one another in the same optical channel (A), at least in the switched-on state, two, in particular completely reflecting, mirrors (14, 15) additionally being provided for folding the optical axis (FIG. 2).

6. Device according to claim 1, characterized in that a focusing means (3, 3', 3") is coordinated with the optical system (1) throwing the light emitted by an object onto the entry window (4) of the low-light-level amplifier (5).

7. Device according to claim 2, characterized in that at least one of the splitter mirrors (2 or 8) is an optical element, having a splitter coat on one of its surfaces.

8. Device according to claim 7, characterized in that at least one of the splitter mirrors (2, 8) is an optical element, in particular a plane-parallel plate, which can be tilted about an axis of rotation (23) from one position (e.g. 2A, 8A), optionally adjustable by an adjustment means (18–20), into another end position (e.g. 2B, 8B) optionally adjustable by an adjustment means (18–20).

9. Device according to claim 2, characterized in that a common actuating means (16) is provided for operating the splitter mirrors (2, 8).

10. Device according to claim 1, characterized in that an eyepiece (13) is arranged before the receptor (13').

\* \* \* \* \*